US011070967B2

(12) United States Patent
Zhang et al.

(10) Patent No.: US 11,070,967 B2
(45) Date of Patent: Jul. 20, 2021

(54) NETWORK NODES AND METHODS PERFORMED THEREIN FOR ENABLING COMMUNICATION IN A COMMUNICATION NETWORK

(71) Applicant: TELEFONAKTIEBOLAGET LM ERICSSON (PUBL), Stockholm (SE)

(72) Inventors: Shunliang Zhang, Beijing (CN); Jian Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/065,969

(22) PCT Filed: Dec. 29, 2015

(86) PCT No.: PCT/CN2015/099458
§ 371 (c)(1),
(2) Date: Jun. 25, 2018

(87) PCT Pub. No.: WO2017/113100
PCT Pub. Date: Jul. 6, 2017

(65) Prior Publication Data
US 2019/0020996 A1   Jan. 17, 2019

(51) Int. Cl.
*H04W 8/12* (2009.01)
*H04W 8/14* (2009.01)
(Continued)

(52) U.S. Cl.
CPC .............. *H04W 8/12* (2013.01); *H04W 8/14* (2013.01); *H04W 48/18* (2013.01); *H04W 88/16* (2013.01); *H04W 84/00* (2013.01); *H04W 84/042* (2013.01)

(58) Field of Classification Search
CPC ......... H04W 8/12; H04W 8/14; H04W 48/18; H04W 88/16; H04W 84/00; H04W 84/042
(Continued)

(56) References Cited

U.S. PATENT DOCUMENTS 8,983,457 B2    3/2015  Zhao
2016/0353465 A1*  12/2016  Vrzic ................... H04W 12/06
(Continued)

FOREIGN PATENT DOCUMENTS

| CN | 101513091 A | 8/2009 |
|---|---|---|
| CN | 103650437 A | 3/2014 |

(Continued)

OTHER PUBLICATIONS

ETSI GS NFV-MAN 001 V1.1.1 (Year: 2014).*
(Continued)

*Primary Examiner* — Yemane Mesfin
*Assistant Examiner* — Intekhaab A Siddiquee
(74) *Attorney, Agent, or Firm* — Sage Patent Group

(57) ABSTRACT

Embodiments herein relate to a method performed by a second network node for enabling communication for a wireless device in a communication network, which communication network comprises a first network and a second network. The second network node is associated with the second network and the first network is a home network of the wireless device. The first network comprises partitioned sets of functionalities wherein a first set of functionalities belongs to a first network slice supporting the wireless device, and which first set of functionalities is separated from another set of functionalities out of a total set of functionalities in the first network. The second network node, when the wireless device is roaming from the first network to the second network, initiates a connection estab-
(Continued)

lishment to a first network node associated with the first network. The second network node retrieves a policy indication from the first network node, which policy indication indicates a first network slice and roaming policy for the wireless device in the first network. The second network node further triggers a selection of a second network slice and roaming policy for the wireless device in the second network, which selection is based on the retrieved policy indication and internal data related to the second network.

20 Claims, 11 Drawing Sheets

(51) Int. Cl.
*H04W 48/18* (2009.01)
*H04W 88/16* (2009.01)
*H04W 84/00* (2009.01)
*H04W 84/04* (2009.01)

(58) Field of Classification Search
USPC .......................................................... 370/329
See application file for complete search history.

(56) References Cited

U.S. PATENT DOCUMENTS

2017/0086118 A1* 3/2017 Vrzic .................... H04W 36/26
2019/0124671 A1* 4/2019 Starsinic ........... H04W 72/1205

FOREIGN PATENT DOCUMENTS

| CN | 104636146 A | 5/2015 |
| KR | 20110112545 A | 10/2011 |
| KR | 101265440 B1 | 5/2013 |
| KR | 1020130047489 A | 5/2013 |

OTHER PUBLICATIONS

U.S. Appl. No. 62/220,731, (Year: 2015).*
U.S. Appl. No. 62/220,564, (Year: 2015).*
U.S. Appl. No. 62/169,243, (Year: 2015).*
International Search Report and Written Opinion, dated Sep. 22, 2016, from corresponding PCT Application No. PCT/CN2015/099458.

* cited by examiner

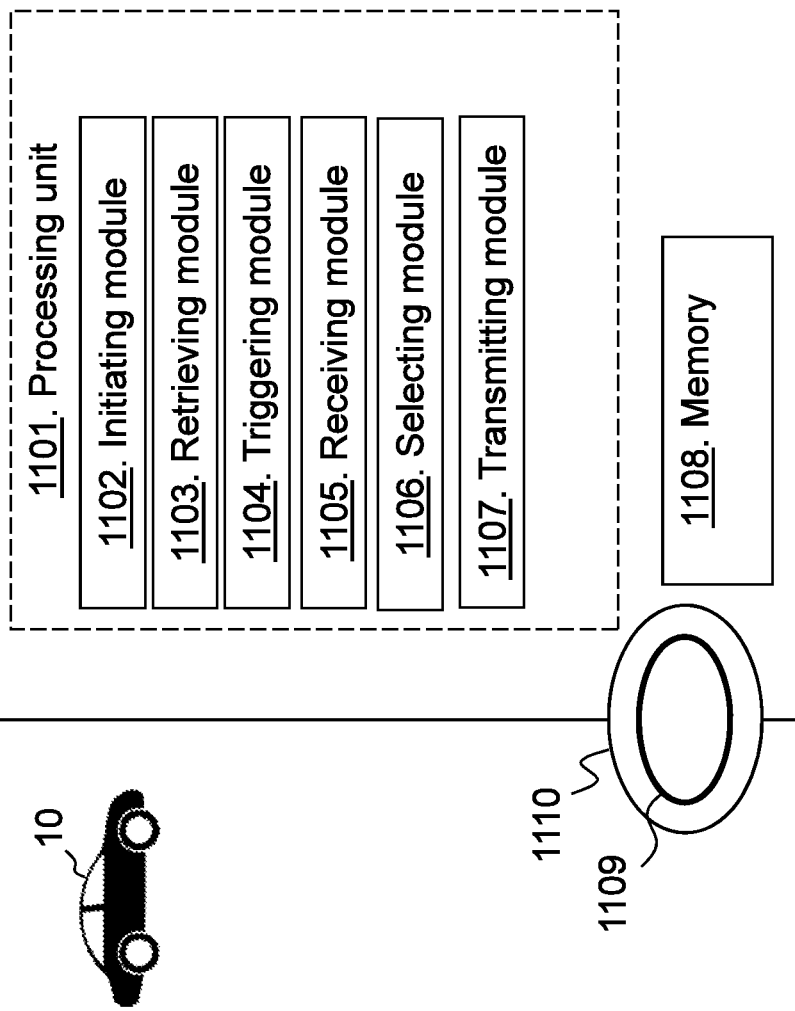
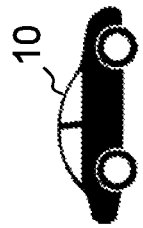
Fig. 11

NETWORK NODES AND METHODS PERFORMED THEREIN FOR ENABLING COMMUNICATION IN A COMMUNICATION NETWORK

TECHNICAL FIELD

Embodiments herein relate to a first network node, a second network node and methods performed therein for communication. Furthermore, a computer program and a computer readable storage medium are also provided herein. In particular, embodiments herein relate to enabling communication for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
  S1-interface management functions such as S1 setup, error indication, reset and the radio network node and MME configuration update.
  UE Context Management functionality such as Initial Context Setup Function and UE Context Modification Function.
  E-UTRAN Radio Access Bearer (E-RAB) Service Management function e.g. Setup, Modify, Release.
  Mobility Functions for wireless devices in EPS Connection Management (ECM)-CONNECTED, e.g. Intra-LTE Handover and inter-3GPP-Radio Access Technology (RAT) Handover.
  S1 Paging function.
  Non Access Stratum (NAS) Signaling Transport function.
  Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

As expected by leading operators and vendors in Next Generation Mobile Networks (NGMN) association, diverse applications or services are expected to be provided by 5G networks. 5G will support countless emerging use cases with a high variety of applications and variability of their performance attributes: from delay-sensitive video applications to ultra-low latency, from high speed entertainment applications in a vehicle to mobility on demand for connected objects, and from best effort applications to reliable and ultra-reliable ones such as health and safety. Furthermore, use cases will be delivered across a wide range of devices, e.g., smartphones, wearables, MTCs, and across a fully heterogeneous environment.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. Obviously, different use cases put different requirements to future networks. For example, acceptable interruption time, reliability and availability, acceptable latency, data rate, as well as cost per user. It would be quite difficult or cost impossible to deploy a common network service to fulfill such extremely diverse requirements. In the situation, network slicing was proposed as a concept to fulfill rich requirements from various 5G use cases. Meanwhile, the network concept is getting widely recognition in NGMN. A network slice supports the communication service of a particular connection type with a specific way of handling C-plane and U-plane for the service. A 5G slice could be composed by a collection of 5G network functions and possibly specific RAT with specific settings that are combined together for the specific use case or business model. It should be noted that not all slices contain the same network functions. A specific network service can be instantiated according to on demand requirements for third party users/operators and the business policy between the network service providers and network the service consumers. Thus, an operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator service and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national safety
Verticals industries, e.g. automation, transportation
Residential users These different users and services are also expected to put new requirements on the network. FIG. 5 shows an example of a network slicing for a case when there exists different network slices in the core network for MBB, Massive MTC and Critical MTC.

Network service provision to wireless devices roaming out of home Public Land Mobile Network (PLMN) network has been supported over 3G and 4G. It will be no exception for 5G network. For roaming wireless devices, the network slice may be provided by Visited PLMN (VPLMN) totally in local breakout way, or joint provided by Home PLMN (HPLMN) and VPLMN in a home routed way, or even it could be provided by HPLMN totally and a CN of VPLMN is totally bypassed. From practical business perspective, due to resource restriction or business limitation, it is possible that certain types of network slice is not available in certain areas. In a different area or different operators, different network slice services are provided. It is highly possible that the network slice types provided by HPLMN and those provided VPLMN may be different due to different business strategy. The specific network slice to be used for the roaming wireless device needs the involvement of both HPLMN and VPLMN, and it is more complex compared to a non-roaming situation.

At the same time, inspired by the great success of the cloud technology; the telecom industry is considering providing cloud based network service by NFV initiative at ETSI. AS stated above NFV will transform the way that networks are built and operated by leveraging standard virtualization technology and consolidating network equipment types onto "industry standard" servers. The NFV technology will make it more flexible and efficient to provide and operate the virtual mobile network service, as well as value added service with low CAPEX and Operating Expenditures (OPEX) and reduced time to market. With the quick developing of cloud computing and NFV technology, it can be expected that more and more 5G network service will be deployed in cloud environment in the form of various network slices for agile operation and scale in context of dynamic user requirement.

Based on current NFV and Software Defined Networking (SDN) technology trend, it can be expected that 5G network service will be deployed over cloud infrastructure. In could environment, it is highly possible that a specific network slice is dynamically instantiated/terminated or scaled out/in to support flexible business model and efficient resource utilization. The network slice service provided by a network operator is more dynamic compared to traditional network service. For roaming users, the network slice selection involves both HPLMN and VPLMN. Therefore, one important issue is how to coordinate the strategy of both PLMNs and Network slice provision status of both PLMNs, as well as user preference during network slice selection process for the roaming user. Another related issue is the routing approach, e.g. home routed or local breakout, how to determine the appropriate routing approach for roaming users in context of cloud network environment with richer and dynamic network slice capability, capability difference between HPLMN and VPLMN and diverse user requirement For example, a user is roaming to a new area, in case the wireless device doesn't know the available network slice type in an area, it may select a specific network slice type/ID based on its preference. While, when the specific network slice is terminated, or out of service or overloaded, once the wireless device sets up a network connection and indicates the specific network slice type to an access network, it is highly possible that wireless device would be rejected, which would result in a negative user experience and performance of the communication network and additional signaling overhead may be required.

SUMMARY

An object of embodiments herein is to provide a mechanism for improving performance of the communication network in an efficient manner.

According to an aspect the object is achieved by a method performed by a second network node for enabling communication for a wireless device in a communication network. The communication network comprises a first core network and a second core network, which second network node is associated with the second core network and the first core network is a home core network of the wireless device. The first core network comprises partitioned sets of functionalities wherein a first set of functionalities belongs to a first network slice supporting the wireless device. The first set of functionalities is separated from another set of functionalities out of a total set of functionalities in the first core network. When the wireless device is roaming from the first core network to the second core network, the second network node initiates a connection establishment to a first network node associated with the first core network. The second network node retrieves a policy indication from the first network node, which policy indication indicates a first network slice and roaming policy for the wireless device in the first network. The second network node further triggers a selection of a second network slice and roaming policy for the wireless device in the second network, which selection is based on the retrieved policy indication and internal data related to the second network.

According to another aspect the object is achieved by a method performed by a first network node for enabling communication for a wireless device in a communication network. The communication network comprises a first network and a second network, which first network is a home network of the wireless device. The first network comprises partitioned sets of functionalities wherein a first set of functionalities belongs to a first network slice supporting the wireless device, and which first set of functionalities is separated from another set of functionalities out of a total set of functionalities in the first network. When the wireless device is roaming from the first network to the second network, the first network node receives a request for a connection establishment to a second network node associated with the second network. The first network node then provides a policy indication to the second network node, which policy indication indicates a first network slice selection and roaming policy for the wireless device in the first network.

According to yet another aspect the object is achieved by providing a second network node for enabling communication for a wireless device in a communication network. The communication network comprises a first network and a second network, which second network node is associated with the second network and the first network is a home network of the wireless device. The first network comprises partitioned sets of functionalities wherein a first set of functionalities belongs to a first network slice supporting the wireless device. The first set of functionalities is separated from another set of functionalities out of a total set of functionalities in the first network. The second network node is configured to, when the wireless device is roaming from the first network to the second network, initiate a connection establishment to a first network node associated with the first network. The second network node is configured to retrieve a policy indication from the first network node, which policy indication indicates a first network slice and roaming policy for the wireless device in the first network. The second network node is further configured to trigger a selection of a second network slice and roaming policy for the wireless device in the second network, which selection is based on the retrieved policy indication and internal data related to the second network.

According to still another aspect the object is achieved by providing a first network node for enabling communication for a wireless device in a communication network. The communication network comprises a first network and a second network, which first network is a home network of the wireless device. The first network comprises partitioned sets of functionalities wherein a first set of functionalities belongs to a first network slice supporting the wireless device, and which first set of functionalities is separated from another set of functionalities out of a total set of functionalities in the first network. The first network node is configured to, when the wireless device is roaming from the first network to the second network, receive a request for a connection establishment to a second network node associated with the second network. The first network node is further configured to provide a policy indication to the second network node, which policy indication indicates a first network slice and roaming policy for the wireless device in the first network.

It is furthermore provided herein a computer program comprising instructions, which, when executed on at least one processor, cause the at least one processor to carry out any of the methods above, as performed by the first network node or the second network node. It is additionally provided herein a computer-readable storage medium, having stored thereon a computer program comprising instructions which, when executed on at least one processor, cause the at least one processor to carry out the method according to any of the methods above, as performed by the first network node or the second network node.

Embodiments herein introduce an efficient manner of enabling sliced network structuring and usage by retrieving the first network slice and roaming policy from the first network and then selecting the second network slice and roaming policy taking the first network slice and roaming policy and the internal data such as local policies and capabilities into consideration. It should here be noted that the second network slice and roaming policy may relate to a network slice that can be a network slice of the first network and/or a network slice of the second network. Hence, the wireless device would not be dropped in case the network slice is not supported in the second network but instead a similar slice may be provided to the wireless device leading to an improved performance of the wireless communication network.

BRIEF DESCRIPTION OF THE DRAWINGS

Embodiments will now be described in more detail in relation to the enclosed drawings, in which:

FIG. 11 is a block diagram depicting a second network node according to embodiments herein.

DETAILED DESCRIPTION

Figure 1:
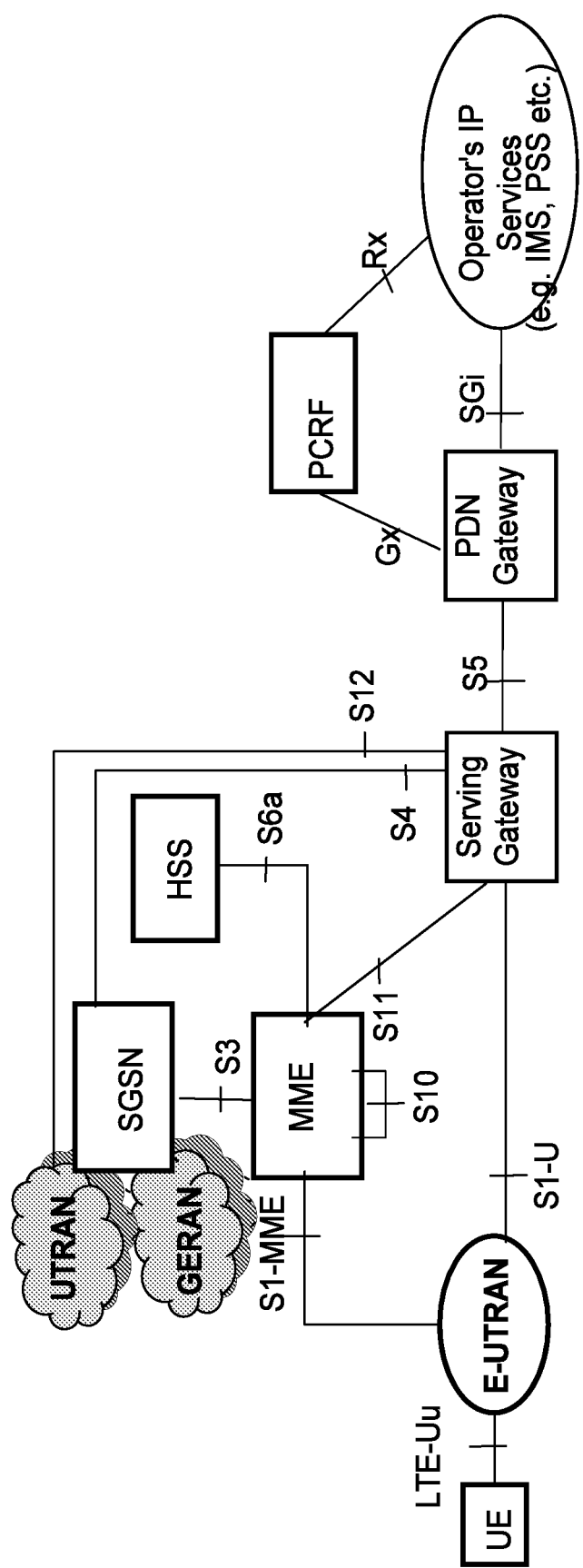
FIG. 1 is a schematic overview depicting a communication network according to prior art.
Figure 2:
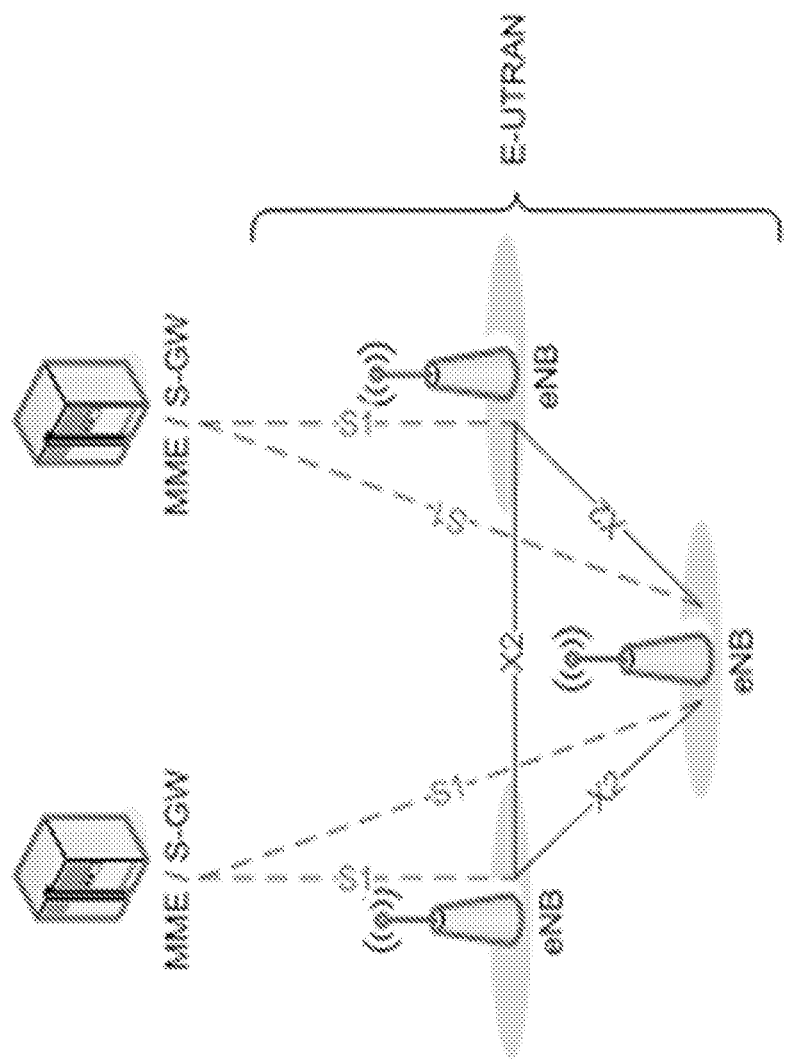
FIG. 2 is a schematic overview depicting a radio access network in connection with a core network.
Figure 3:
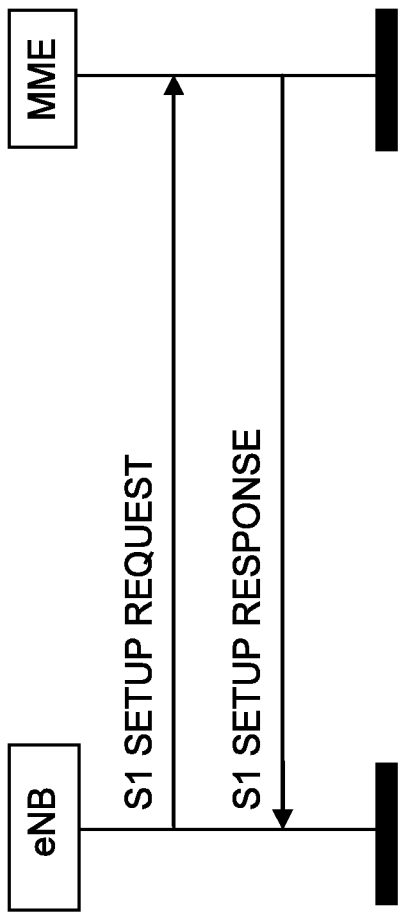
FIG. 3 is a signalling scheme according to prior art.
Figure 4:
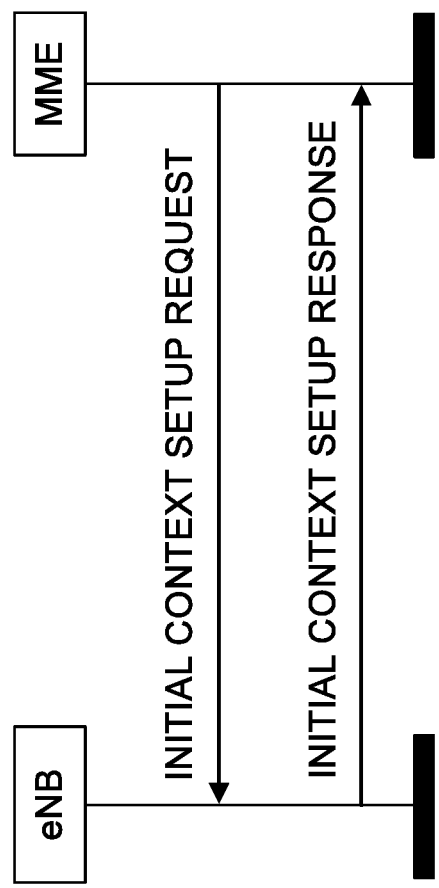
FIG. 4 is a signalling scheme according to prior art.
Figure 5:
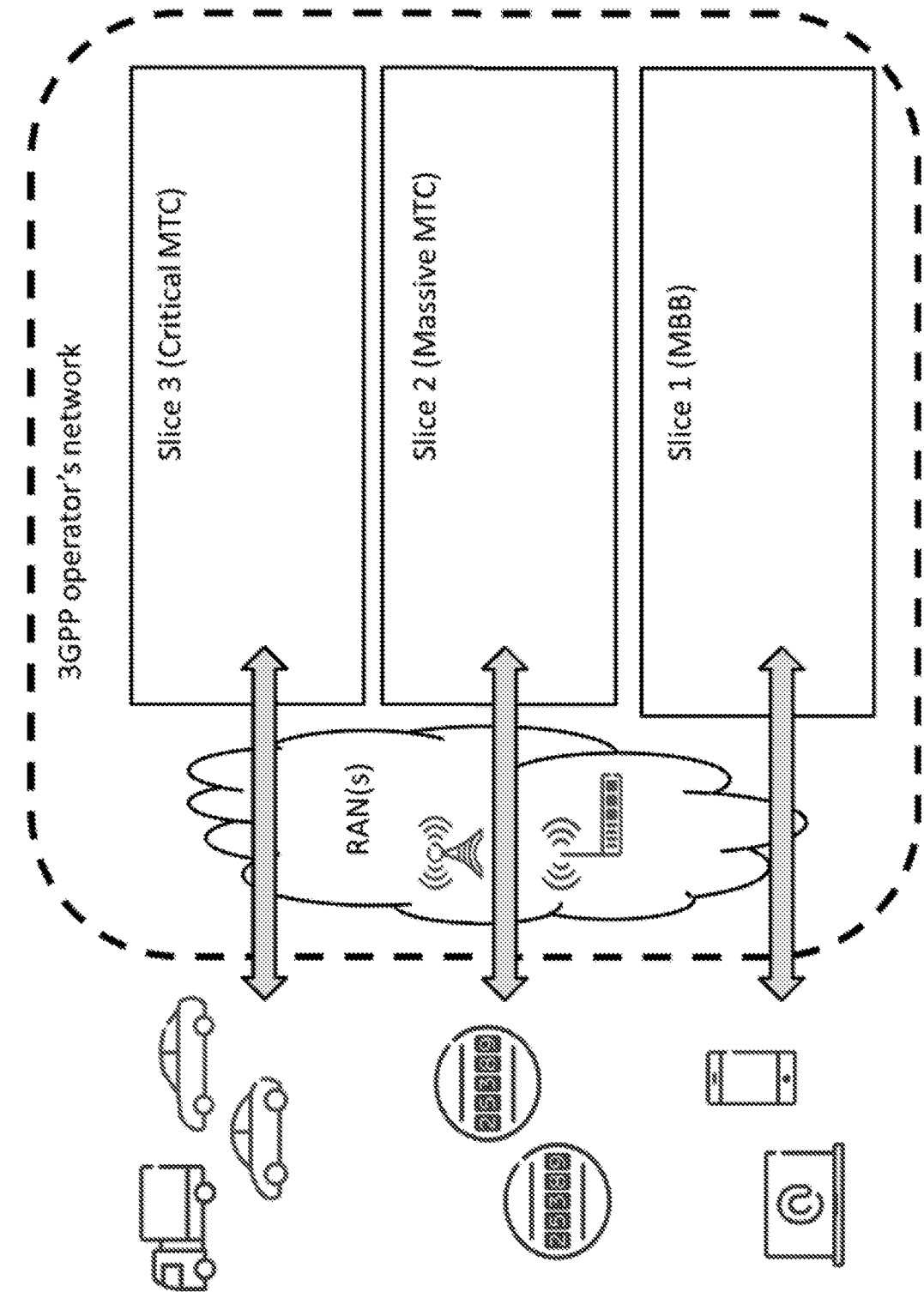
FIG. 5 is a schematic overview depicting an example of a slicing of a core network according to prior art.
Figure 6:
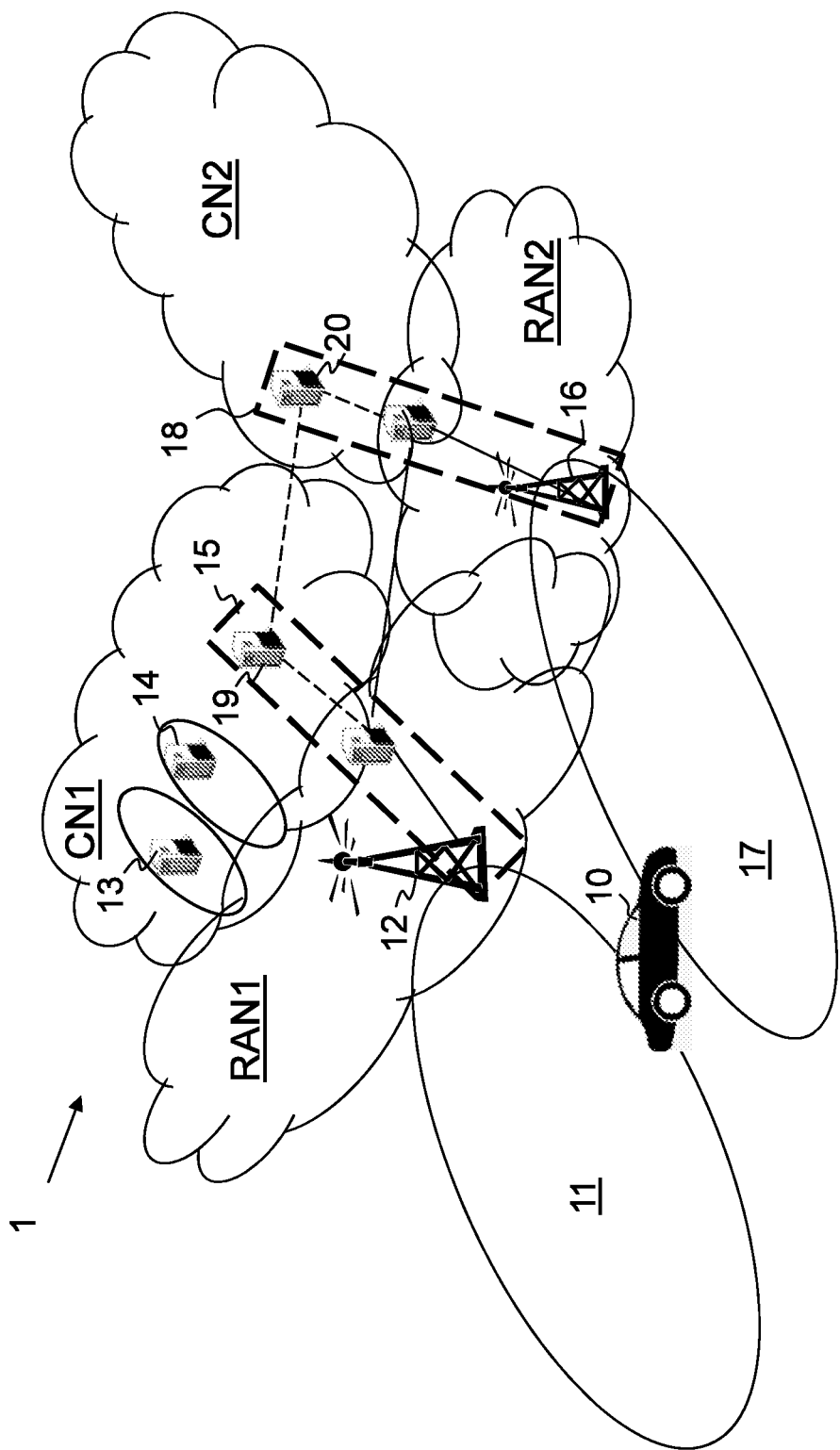
FIG. 6 is a schematic overview depicting a communication network according to embodiments herein.

Embodiments herein relate to communication networks in general. FIG. 6 is a schematic overview depicting a communication network 1. The communication network 1 comprises RANs and CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a first radio network node 12 providing radio coverage over a geographical area, a first service area 11, of a first radio access technology (RAT), such as LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the first radio access technology and terminology used. The first radio network node 12 is comprised in a first radio access network (RAN1) of a first network.

Furthermore, the first network or home network comprises a first core network (CN1) also denoted home core network of the wireless device 10. The first network is virtually network sliced into a number of network slices, the CN1 and/or the RAN1 may be virtually network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 13. A second network slice for e.g. MBB devices may comprise a second network slice node 14. Each network slice supports a set of functionalities out of a total set of functionalities in the communication network. E.g. the first network slice node 13 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physical separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 13 supports the first set of functionalities out of the total set of functionalities in the first network of the communication network, which first set of functionalities belongs to the first network slice of the first network, and is separated from another set of functionalities out of the total set of functionalities in the first network.

The RAN1 and CN1 comprise one or more first network nodes 15, such as first core network nodes 19 e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. The first network node 15 may further be a radio access network node such as the first radio network node 12.

Furthermore, the communication network 1 comprises a second network or visited network comprising a second core network (CN2), also denoted as visited core network, and a second RAN, RAN2. Also this second network may be network sliced e.g. as the first network or differently. The communication network 1 further comprises a second radio network node 16 providing radio coverage over a geographical area, a second service area 17, of a second radio access technology (RAT), such as LTE, UMTS, Wi-Fi or similar. The second radio network node 16 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio network node 16 depending e.g. on the second radio access technology and terminology used. The second radio network node 16 is comprised in the second radio access network, RAN2. The first and second RAT may be the same or different RATs.

The second network comprise one or more second network nodes 18, such as second core network nodes 20 e.g. Radio SDN nodes, MMEs, S-GWs, SGSNs, or corresponding nodes in e.g. a 5G network or similar. The second network node 18 may further be a radio access network node such as the second radio network node 16.

According to embodiments herein the wireless device 10 moves into the second service area 17 of the second radio network node 16. A second network node 18, e.g. a RAN node or a CN node associated with the second network, initiates a connection establishment to the first network node 15 associated with the first network. The second network node 18 retrieves a policy indication from the first network node 15, which policy indication indicates a first network slice and roaming policy for the wireless device 10 in the first network. Slice capability such as supported slice types may also be exchanged during the retrieving process. The second network node 18 triggers a selection of a second network slice and roaming policy for the wireless device 10 in the second network based on the retrieved policy indication and internal data related to the second network. Internal data being e.g. set of slice selection policies of the second network, roaming policy of the second network, slice capability of the second network, network slice and roaming policies of the second network, user preferences of the wireless device 10 and/or similar. A network slice and roaming policy may e.g. be a local breakout, e.g. the network slice of the second network is selected and user traffic is directly routed out to internet by S/P-GW in the network slice i.e. only the network slice of the second network is involved. The network slice and roaming policy may alternatively be home routed via a local network slice to the first network slice, e.g. both function in network slice of the first network and function in network slice of the second network, and the network slice is selected and user traffic is routed through S-GW in network slice of the second network and P-GW in network slice of the first network out to internet, i.e. both network slice of the first network and network slice of the second network are involved. Furthermore, the network slice and roaming policy may be Home routed directly from the RAN of the second network to the first network slice of first network, e.g. user traffic is routed from RAN of the first network to S/P-GW in the first network slice of the first network out to internet, only network slices of the first network is involved. The first network slice and roaming policy may comprise one or more of the following: HPLMN Preferred slice ID/type to the wireless device, condition to apply the slice ID/type, roaming policy e.g. local breakout, home routed via VPLMN CN, or home routed directly from VPLMN RAN and Possibly slice ID/type of network slices supported by HPLMN Hence, embodiments herein provide an effective selection of policy, also called network slice and roaming policy, for network slice selection for roaming wireless devices in the communication network that is simple and feasible from an implementation perspective, e.g. only enhancement on existing interfaces and network functions. This results in that less wireless devices are rejected during roaming and more are being served in the second network as served in the first network improving the performance of the communication network 1. Hence, embodiments herein provide an effective manner to support network slice selection for roaming wireless devices. It is a way to flexible network slice deployment to support agile business model by both the first and second network, and is simple and feasible from an implementation perspective, e.g. only enhancement on existing interlaces and network functions.

Figure 7:
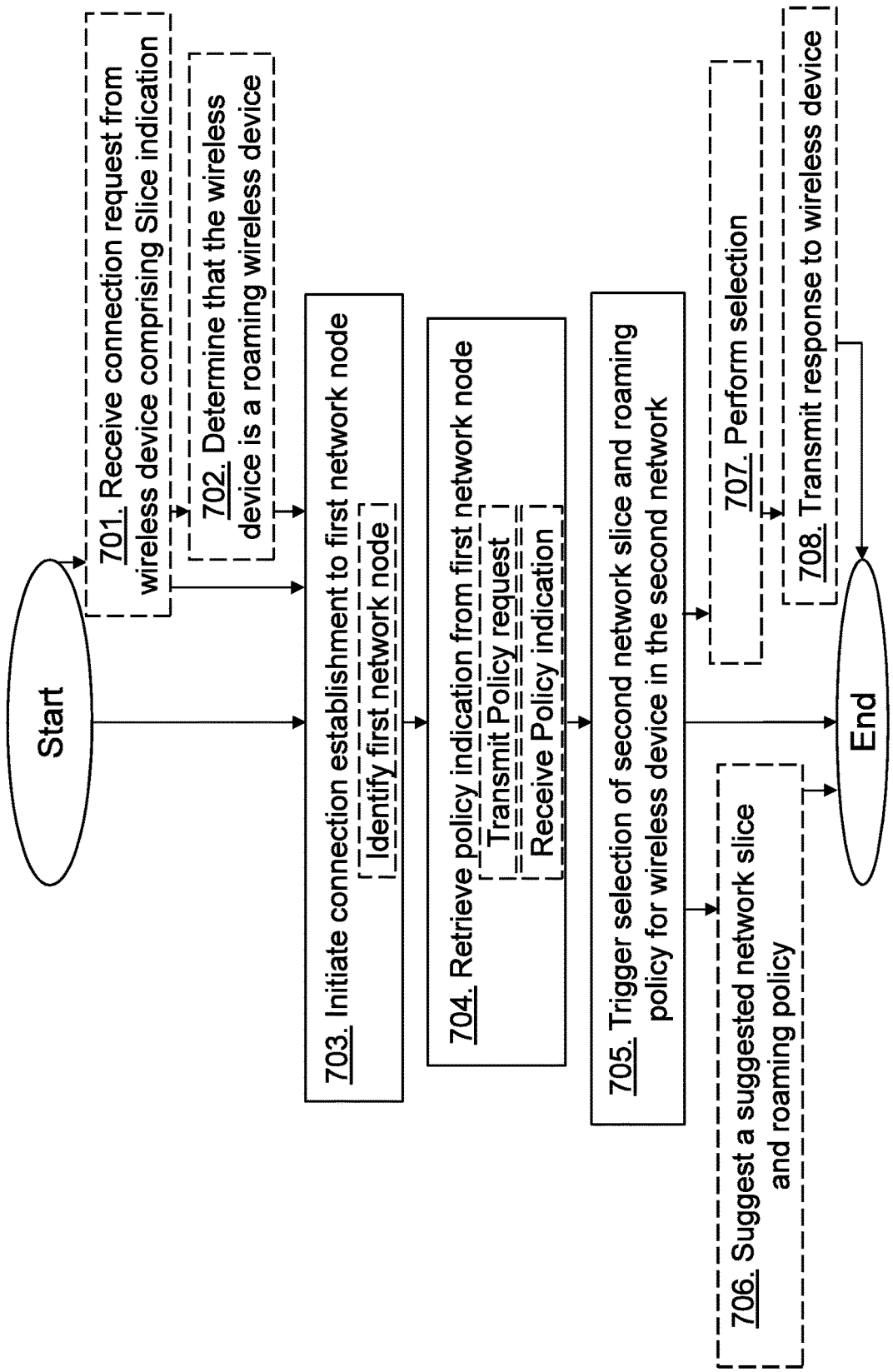
FIG. 7 is a schematic flowchart depicting a method performed by a second network node according to embodiments herein.

The method actions performed by the second network node 18 for enabling communication for the wireless device 10 in the communication network 1 according to embodiments herein will now be described with reference to a flowchart depicted in FIG. 7. The actions do not have to be taken in the order stated below, but may be taken in any suitable order. Actions performed in some embodiments are marked with dashed boxes. The communication network 1 comprises the first network and the second network. The second network node 18 is associated with the second network and the first network is a home network of the wireless device 10. The first network comprises partitioned sets of functionalities wherein the first set of functionalities belongs to the first network slice supporting, or contacted by, the wireless device 10. Furthermore, the first set of functionalities is separated from another set of functionalities out of a total set of functionalities in the first network.

Action 701. The second network node 18 may receive a connection request from the wireless device 10 comprising a slice indication, which slice indication indicates the first network slice. That is, the wireless device 10 may request a connection to the first network slice by adding the slice ID of the first network slice into the request.] If the slice selection function is in RAN2, then the connection request may be a RRC connection establishment request. If the function is in CN2, then the connection request may be NAS message, an attach request.

Action 702. The second network node 18 may determine that the wireless device 10 is a roaming wireless device.

Action 703. The second network node 18 initiates, when the wireless device 10 is roaming from the first network to the second network, a connection establishment to the first network node 15 associated with the first network. The first network node 15 may be a core network node or a radio access network node, such as the first radio network node 12, associated with the first network. The initiation may comprise identifying the first network node 15 from a domain name system. In case the node is in RAN the connection establishment may be a transmission protocol is RRC, e.g. RRC connection establishment request. In case the nodes are in CN, the transmission protocol between RAN and CN is S1-AP, e.g. an Initial message, a NAS message, Action 704. The second network node 18 retrieves the policy indication from the first network node 15, which policy indication indicates the first network slice and roaming policy for the wireless device 10 in the first network. The policy indication may be the actual first network slice and roaming policy, an index pointing to a certain network slice and roaming policy in a table stored at the second network node 18 or similar. To retrieve the policy indication, the second network node 18 may e.g. transmit, to the first network node 15, a policy request requesting retrieval of the policy indication. The policy request may be a Diameter message, widely used for communication between HPLMN and VPLMN., e.g. the message carrying the request may be a new one or an existing one, e.g. Internet Protocol-Connectivity Access Network (IP-CAN) establishment. The policy request may comprise data relating to the second network e.g. slice capability of the second network such as preferred Slice ID/type, Slice ID/types supported by the second network. The policy request may also comprise wireless device information of the wireless device 10 such as wireless device ID, wireless device type, Slice ID/type requested by the wireless device 10 and/or service type indicated by the wireless device 10. The second network node 18 may then receive the policy indication from the first network node 15 as requested. It should be noted that the policy indication may also comprise a slice capability for the wireless device 10 in the first network.

Action 705. The second network node 18 triggers the selection of the second network slice and roaming policy for the wireless device 10 in the second network. The selection is based on the retrieved policy indication and internal data related to the second network. Such internal data may be a local network slice selection policy, slice capability of local networks, e.g. slice ID/slice type supported by the second network, and a local network slice and roaming policy. Hence, the second network node 18 may e.g. compare the first network slice and roaming policy indicated by the policy indication, and local network slice and roaming policies to select e.g. a local network slice and roaming policy or a home network slice and roaming policy that is a network slice and roaming policy as the first network slice and roaming policy supporting the wireless device 10 in the first network. Furthermore, the triggered selection may further be based on the slice indication received from the wireless device 10. That is, the second network node 18 may trigger a selection where a Slice ID from the wireless device 10, the retrieved first network slice and roaming policy and one or more local network slice and roaming policies are compared and analyzed to determine a preferred network slice and roaming policy for the wireless device 10.

Action 706. In some embodiments, the second network node 18 may suggest a suggested network slice and roaming policy for the wireless device 10 in the second network based on the retrieved policy indication and the internal data related to the second network as stated above. The suggested network slice and roaming policy may then be transmitted to a RAN node, e.g. the second radio network node 16 or another radio network node in the second RAN, associated with the second network.

Action 707. Alternatively, the second network node 18 may perform, e.g. when being the second radio network node 16, the selection of the second network slice and roaming policy for the wireless device 10 in the second network. The selection may be triggered and performed when the second network node 18 firstly receives the suggested network slice and roaming policy from a core network node in the CN2.

Action 708. When the second network node 18 performs the selection, the second network node 18 may initiate a transmission of a response to the wireless device 10. The response is taking the selected second network slice and roaming policy into account. The response may be a connection establishment response or similar.

Figure 8:
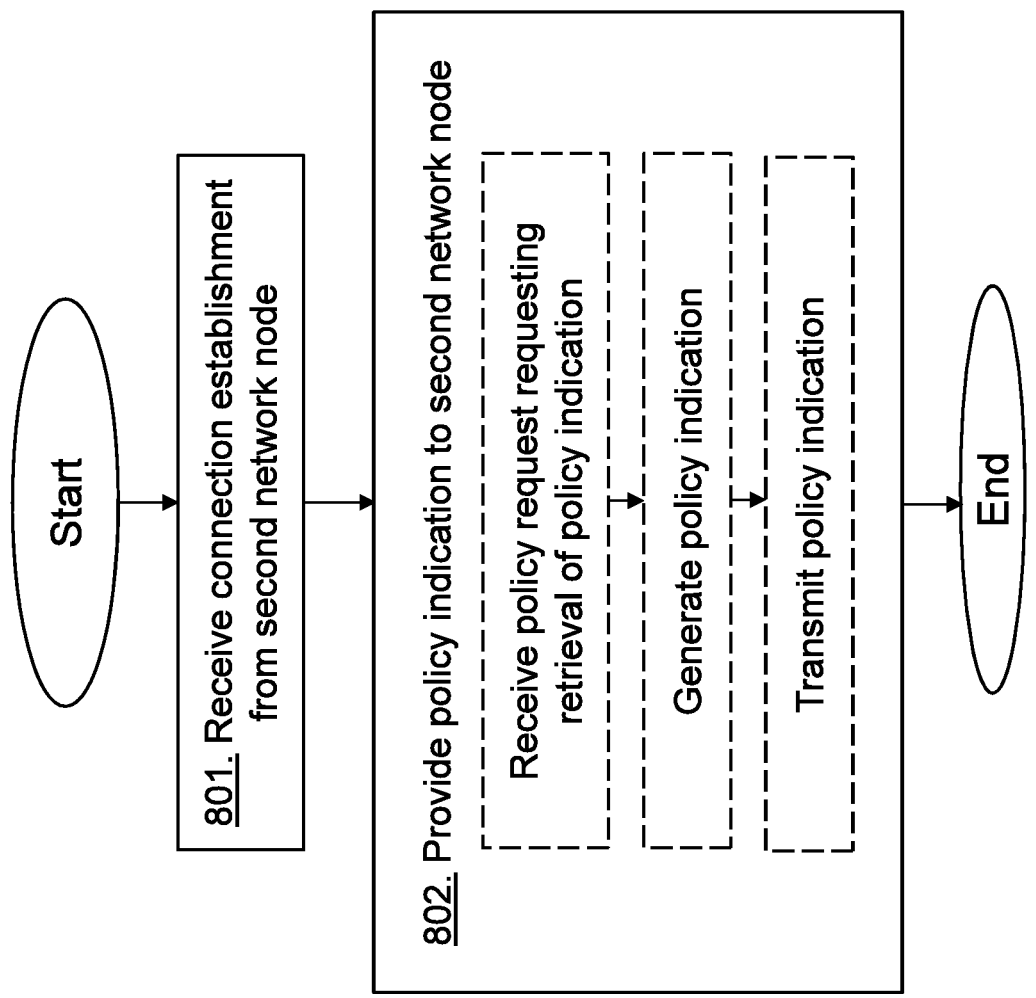
FIG. 8 is a schematic flowchart depicting a method performed by a first network node according to embodiments herein.

The method actions performed by the first network node 15 for enabling communication for the wireless device 10 in the communication network according to some embodiments will now be described with reference to a flowchart depicted in FIG. 8. The actions do not have to be taken in the order stated below, but may be taken in any suitable order. Actions performed in some embodiments are marked with dashed boxes. The communication network 1 comprises a first network and a second network, which first network is a home network of the wireless device 10. The first network comprises partitioned sets of functionalities wherein a first set of functionalities belongs to a first network slice supporting the wireless device 10. The first set of functionalities is separated from another set of functionalities out of a total set of functionalities in the first network.

Action 801. The first network node 15 receives, when the wireless device 10 is roaming from the first network to the second network, a request for a connection establishment to the second network node 18 associated with the second network.

Action 802. The first network node 15 provides the policy indication to the second network node 18, which policy indication indicates the first network slice and roaming policy for the wireless device 10 in the first network. The first network node 15 may provide the policy indication by receiving, from the second network node 18, the policy request requesting retrieval of the policy indication. The request further comprises data relating to the second network and/or wireless device information of the wireless device 10. The first network node 15 may then generate the policy indication based on the received data, the wireless device information and/or information of the first network for the wireless device 10, and also transmit the policy indication to the second network node 18. The information of the first network for the wireless device 10 may comprise the first network slice and roaming policy for the wireless device 10 in the first network, which first network slice and roaming policy is retrieved from an operations support system (OSS) node or a business support system (BSS) node.

Figure 9:
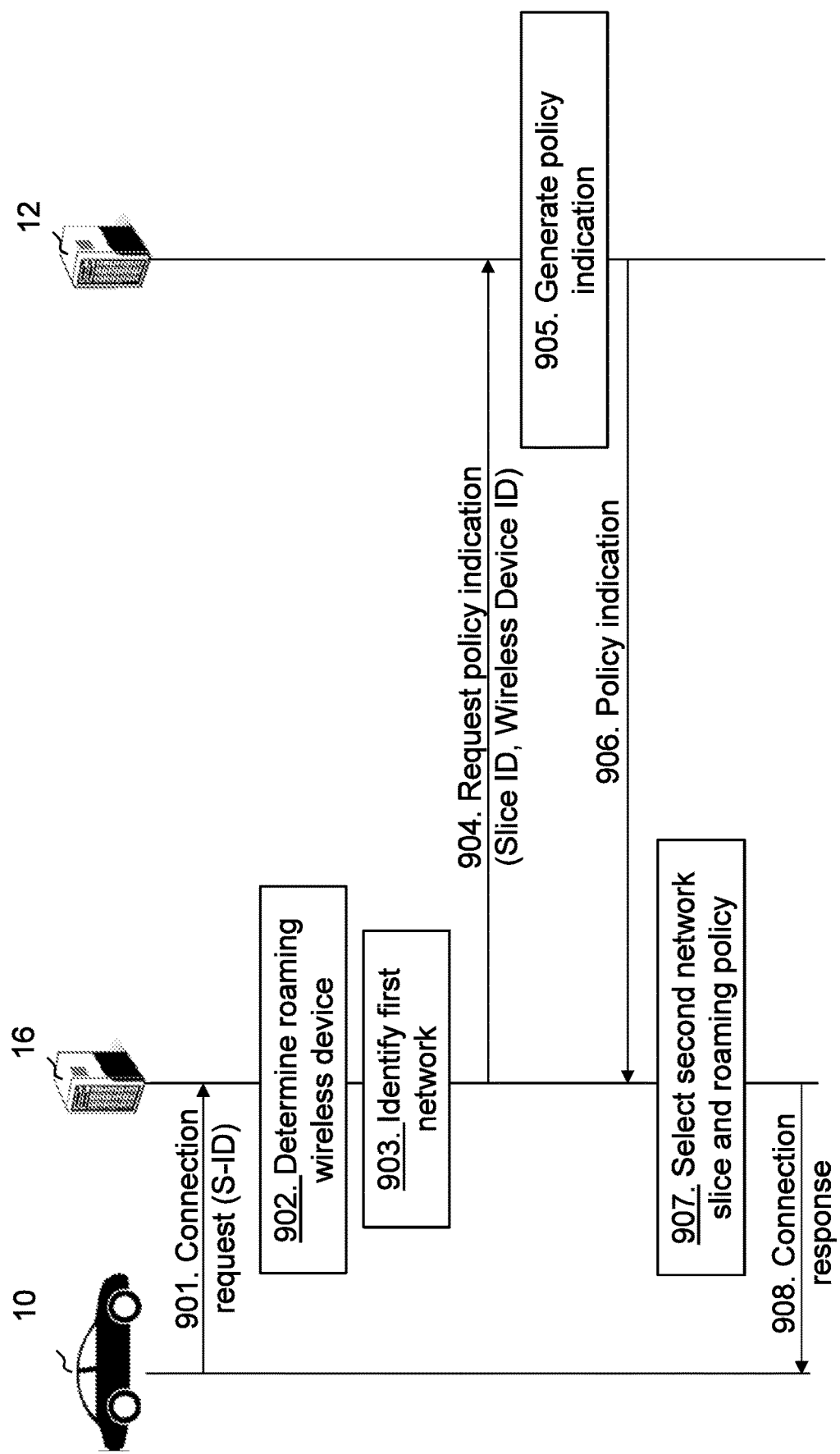
FIG. 9 is a combined flowchart and signalling scheme according to embodiments herein.

FIG. 9 is a combined flowchart and signaling scheme according to some embodiments herein. As stated above the first network may support a number of different network slices wherein the first network slice supports the wireless device 10. For example, the first network slice may be supporting a certain type of wireless devices, a certain enterprise, a certain operator or a certain agreement. Thus, the first set of functionalities of the first network slice may be associated with the certain type of wireless devices, the enterprise, the operator or the agreement. According to embodiments herein the wireless device 10 e.g. an MTC device roams from the first network to the second network. In the illustrated embodiment the second network node 18 is exemplified as the second radio network node 16 in a visiting Public Land Mobile Network (PLMN), and the first network node 15 is exemplified as the first radio network node 12 in a home PLMN, being RAN nodes.

Action 901. The wireless device 10 may perform a connection establishment in the second network by sending a connection request to the second radio network node 16.

Action 902. The second radio network node 16 may then determine that the wireless device 10 is a roaming wireless device. This may be determined based on PLMN ID of the second radio network node and the PLMN ID of the wireless device 10. That is, if the PLMN IDs differ it is determined to be a roaming device.

Action 903. The second radio network node 16 may then identify the first network and the first network node 15, exemplified herein as the first radio network node 12. The second radio network node 16 may identify first radio network node by a DNS process or similar. The second radio network node 16 may comprise a second Network Slice Selection Function (NSSF) and the first radio network node 12 may comprise a first NSSF. Thus, a new interface may be introduced between the second NSSF in the visiting PLMN RAN and the first NSSF in the Home PLMN RAN to coordinate the slice selection and routing approach between Visiting PLMN and Home PLMN for roaming wireless devices.

Action 904. The second radio network node 16 may then request the policy indication from the first radio network node 12. Hence, once the wireless devices 10 is identified as a roaming wireless device, before selecting a network slice for the wireless device 10 in the second network, the second radio network node 16 may contact the first radio network node 12 directly or indirectly through one or more intermediate network nodes, e.g. for security protection and topology hiding, to ask for the policy indication of the home PLMN indicating the first network slice and roaming policy.

Action 905. The first radio network node 12 may then generate the policy indication. During the retrieving process of the policy indication, the second radio network node 16 may provide, to the first radio network node 12, access network related info and slice capability info of the second network e.g. the visiting PLMN. Based on info provided by the second radio network node 16 and e.g. configuration info from OSS/BSS, the first radio network node 12 may generate the policy indication indicating the first network slice and roaming policy.

Action 906. The first radio network node 12 transmits the policy indication to the second radio network node 16. Hence, the first radio network node 12 replies to the second radio network node 16 with the policy indication, which policy indication may be the first network slice and roaming policy or an index pointing to the first network slice and roaming policy in a policy table, and e.g. slice capability info of the first network.

Action 907. The second radio network node 16 then selects, or triggers to select, the second network slice and roaming policy based on the policy indication and internal data such as local policies. By considering e.g. the network slice and roaming policy of second network and that of the first network, and e.g. the connection request from the wireless device 10, the second radio network node 16 may select a specific network slice for the wireless device 10, the specific network slice may be provided by first and/or the second network, and apply a roaming policy based on the selected second network slice and roaming policy for the wireless device 10.

Action 908. The second radio network node 16 transmits a response to the wireless device 10 e.g. a connection response. E.g. the second radio network node 16 replies with a message to wireless device 10 to confirm the connection is successfully established or not. If a new slice is proposed by the second radio network node 16, the message may include the finally selected slice ID/type for the wireless device 10.

The wireless device 10 may then initiate the connection establishment process to the selected slice ID by a NAS signalling process. Related bearers or tunnels to convey application layer traffic are established during the process. The routing approach policy is applied during tunnel establishment, e.g. local breakout or home routed. Through bearers or tunnels established between the wireless device 10 and the network slice, the wireless device 10 may send a service request, such as a HTTP request to an application server. The user plane function, like S/P-GW in EPC, may intercept the user traffic and enforce certain policy to the user traffic, and then the user traffic is routed continually to application server. The application server may reply the application layer response message, an over the top (OTT) service is provided to the wireless device 10

Figure 10:
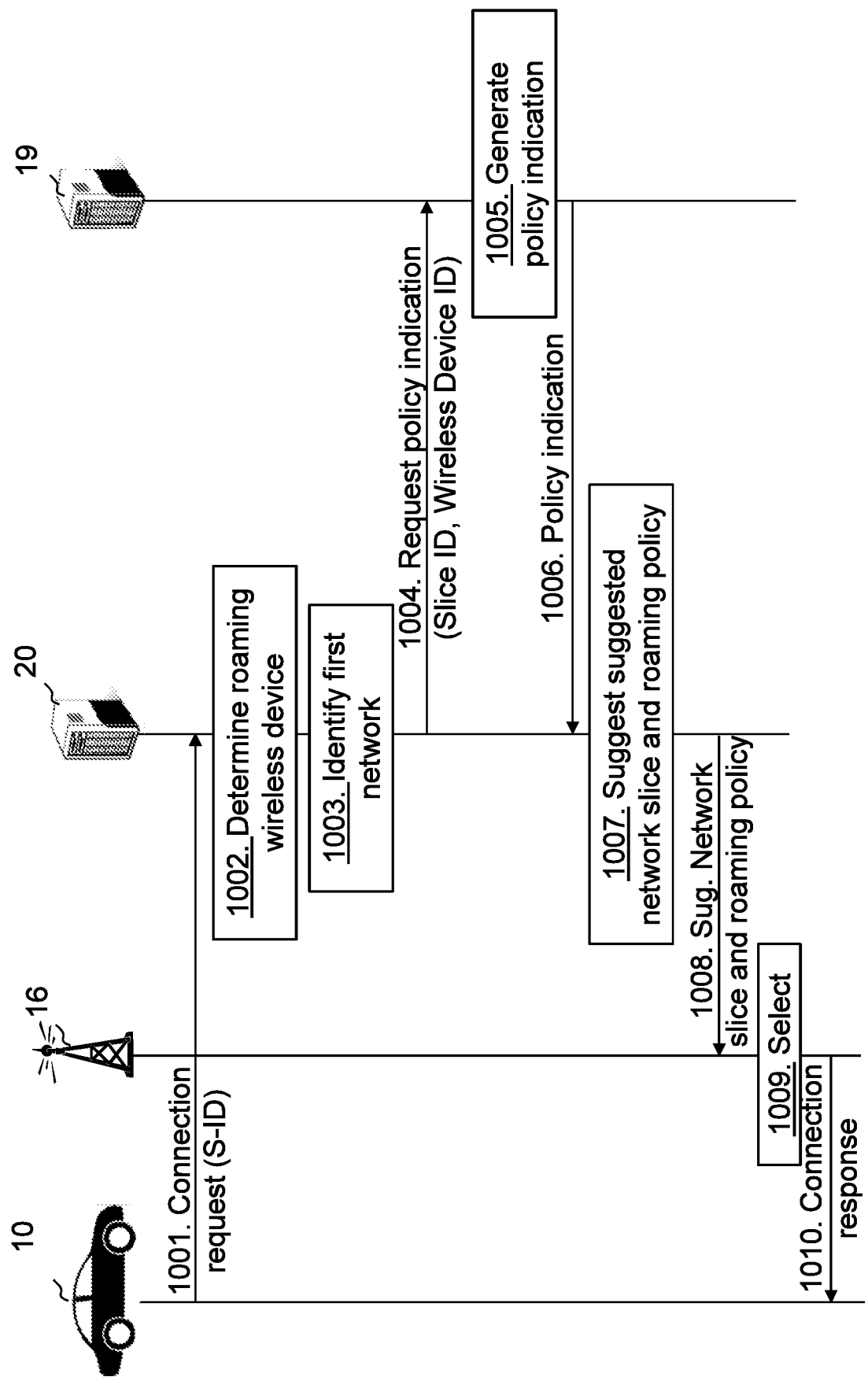
FIG. 10 is a combined flowchart and signalling scheme according to embodiments herein.

FIG. 10 is a combined flowchart and signaling scheme according to some embodiments herein. As stated above the first network may support a number of different network slices wherein the first network slice supports the wireless device 10. For example, the first network slice may be supporting a certain type of wireless devices, a certain enterprise, a certain operator or a certain agreement. Thus, the first set of functionalities of the first network slice may be associated with the certain type of wireless devices, the enterprise, the operator or the agreement. According to embodiments herein the wireless device 10 e.g. an MTC device roams from the first network to the second network. In the illustrated embodiment the second network node 18 is exemplified as the second core network node 20 in the visiting PLMN and the first network node 15 is exemplified as the first core network node 19 in the home PLMN. Each core network node may comprise a Policy and Charging Rules Function (PCRF) that may be configured to assist when selecting the second network slice and roaming policy for the wireless device 10 in the second network.

Action 1001. The wireless device 10 may perform a connection establishment in the second network by sending a connection request to the second core network node 20, via the second radio network node 16.

Action 1002. The second core network node 20 may then determine that the wireless device 10 is a roaming wireless device. This may be determined based on PLMN ID of the second network and the PLMN ID received from the wireless device 10 in the connection request. That is, if the PLMN IDs differ it is determined that the wireless device is a roaming device.

Action 1003. The second core network node 20 may then identify the first network and the first network node 15, exemplified herein as the first core network node 19. The second core network node 20 may identify first core network node 19 by a DNS process or similar. The second core network node 20 may comprise a second PCRF and the first core network node 19 may comprise a first PCRF. Thus, a new interface may be introduced between the second PCRF in the visiting PLMN CN and the first PCRF in the Home PLMN CN to coordinate the slice selection and roaming between Visiting PLMN and Home PLMN for roaming wireless devices.

Action 1004. The second core network node 20 may then request the policy indication from the first core network node 19. Hence, once the wireless devices 10 is identified as a roaming wireless device, before selecting a network slice for the wireless device 10 in the second network, the second radio network node 16 may contact the second core network node 20 to collect coordinated network slice and roaming policy for both first and second network. The second radio network node 16 may provide, to the second core network node 20, access network related info and slice capability info of the second network e.g. the visiting PLMN. The second core network node 20 may contact the first core network node 19 to ask for the strategy and policy of the first network on the network slice and roaming. During the process, the second core network node 20 may provide the first network "network slice capability" info of the second network and user preferred slice type/ID.

Action 1005. The first core network node 19 may then generate the policy indication. Based on info provided by second core network node 20 such as first and second network "network slice capability" info and user preferred slice type/ID, user subscription info and configuration info from OSS/BSS, the first core network node 19 generates the first network slice and roaming policy or the policy indication indicating the first network slice and roaming policy.

Action 1006. The first core network node 19 transmits the policy indication to the second core network node 20. Hence, the first core network node 19 replies the second core network node 20 with the first network slice and roaming policy of the first network and e.g. slice capability info of the first network.

Action 1007. The second core network node 20 may then suggest a suggested network slice and roaming policy for the wireless device 10 in the second network based on the retrieved policy indication and the internal data related to the second network. By coordinating the network slice and roaming policy of the second network and that of the first network, and e.g. the connection request from the wireless device 10, the second core network node 20 may generate the suggested network slice and roaming policy for the wireless device 10.

Action 1008. The second core network node 20 may then transmit the suggested network slice and roaming policy to the second radio network node 16, i.e. the second core network node 20 may provide the suggestion to the second radio network node 16.

Action 1009. The second radio network node 16 may then select the second network slice and roaming policy for the wireless device 10 based on the suggested network slice and roaming policy and e.g. local data of the second radio network node 16. Thus, based on received suggestion from the second core network node 20, the second radio network node 16 may select the second network slice and roaming policy e.g. select a specific network slice for the wireless device 10, which network slice may be provided by first and/or second network, and apply a roaming policy based on the selected second network slice and roaming policy for the wireless device 10.

Action 1010. The second radio network node 16 transmits a response to the wireless device 10 e.g. a connection response. E.g. the second radio network node 16 replies with a message to wireless device 10 to confirm the connection is successfully established or not. If a new network slice is proposed by the second radio network node 16, the message may include the finally selected slice ID/type for the wireless device 10.

The wireless device 10 may then initiate the connection establishment process to the selected slice ID by a NAS signalling process. Related bearers or tunnels to convey application layer traffic are established during the process. The routing approach policy is applied during tunnel establishment, e.g. local breakout or home routed. A control plane function and User plane function interaction to install routing approach policy for the roaming user may be performed. Through bearers or tunnels established between the wireless device 10 and the network slice, the wireless device 10 may send a service request, such as a HTTP request to an application server. The user plane function, like S/P-GW in EPC, may intercept the user traffic and enforce certain policy to the user traffic, and then the user traffic is routed continually to application server. The application server may reply the application layer response message, the OTT service is provided to the wireless device 10.

Hence, in embodiments herein assistance info, also referred to as data relating to the second network, is provided to the first network for assisting when generating the first network slice and roaming policy. This first network slice and roaming policy is provided to the second network. The second network then uses internal data of the second network during selection of the network slice and roaming policy, referred to herein as the second network slice and roaming policy. This results in that the wireless device would not be dropped in case the requested network slice is not supported in the second network but instead a similar slice may be provided to the wireless device, leading to an improved performance of the wireless communication network.

FIG. 11 is a block diagram depicting the second network node 18 for enabling communication for the wireless device 10 in the communication network 1. The communication network 1 comprises the first network and the second network, which second network node 18 is associated with the second network. The first network is a home network of the wireless device 10, and comprises partitioned sets of functionalities wherein the first set of functionalities belongs to the first network slice supporting the wireless device 10. The first set of functionalities is separated from another set of functionalities out of the total set of functionalities in the first network. The second network node 18 may comprise a processing unit 1101, e.g. one or more processors, configured to perform the methods described herein.

The second network node 18 is configured to, when the wireless device 10 is roaming from the first network to the second network, initiate a connection establishment to the first network node 15 associated with the first network. The second network node 18 may comprise an initiating module 1102. The processing unit 1101 and/or the initiating module 1102 may be configured to, when the wireless device 10 is roaming from the first network to the second network, initiate a connection establishment to the first network node 15 associated with the first network.

The second network node 18 is further configured to retrieve the policy indication from the first network node 15, which policy indication indicates the first network slice and roaming policy for the wireless device 10 in the first network. The second network node 18 may comprise a retrieving module 1103. The processing unit 1101 and/or the retrieving module 1103 may be configured to retrieve the policy indication from the first network node 15, which policy indication indicates the first network slice and roaming policy for the wireless device 10 in the first network.

The second network node 18 may further be configured to retrieve the policy indication by being configured to transmit, to the first network node 15, the policy request requesting retrieval of the policy indication, which policy request further comprises data relating to the second network and/or wireless device information of the wireless device 10. The second network node 18 may also be configured to receive the policy indication from the first network node 15. The policy indication may further comprise the slice capability for the wireless device 10 in the first network. The processing unit 1101 and/or the retrieving module 1103 may be configured to retrieve the policy indication by being configured to transmit, to the first network node 15, the policy request requesting retrieval of the policy indication, which policy request further comprises data relating to the second network and/or wireless device information of the wireless device 10. The processing unit 1101 and/or the retrieving module 1103 may further be configured to receive the policy indication from the first network node 15.

The second network node 18 is further configured to trigger the selection of the second network slice and roaming policy for the wireless device 10 in the second network. The selection is based on the retrieved policy indication and internal data related to the second network. The second network node 18 may comprise a triggering module 1104. The processing unit 1101 and/or the triggering module 1104 may be configured to trigger the selection of the second network slice and roaming policy for the wireless device 10 in the second network.

The second network node 18 may then further be configured to trigger the selection of the second network slice and roaming policy by being configured to suggest a suggested network slice and roaming policy for the wireless device 10 in the second network based on the retrieved policy indication and the internal data related to the second network and further being configured to transmit the suggested network slice and roaming policy to a radio access network node, such as the second radio network node 16, associated with the second network. The processing unit 1101 and/or the triggering module 1104 may be configured to trigger the selection of the second network slice and roaming policy by being configured to suggest a suggested network slice and roaming policy for the wireless device 10 in the second network based on the retrieved policy indication and the internal data related to the second network. The processing unit 1101 and/or the triggering module 1104 may further be configured to transmit the suggested network slice and roaming policy to a radio access network node, such as the second radio network node 16, associated with the second network.

The second network node 18 may also be configured to receive the connection request from the wireless device 10 comprising the slice indication, e.g. Slice ID, which slice indication indicates the first network slice. The triggered selection may then further be based on the slice indication. The second network node 18 may comprise a receiving module 1105. The processing unit 1101 and/or the receiving module 1105 may be configured to receive the connection request from the wireless device 10 comprising the slice indication, e.g. Slice ID, which slice indication indicates the first network slice.

The second network node 18 may be configured to perform the selection of the second network slice and roaming policy for the wireless device 10 in the second network. The second network node 18 may comprise a selecting module 1106. The processing unit 1101 and/or the selecting module 1106 may be configured to perform the selection of the second network slice and roaming policy for the wireless device 10 in the second network.

The second network node 18 may then further be configured to initiate the transmission of the response to the wireless device 10, which response is taking the selected second network slice and roaming policy into account. The second network node 18 may comprise a transmitting module 1107. The processing unit 1101 and/or the transmitting module 1107 may be configured to initiate the transmission of the response to the wireless device 10, which response is taking the selected second network slice and roaming policy into account.

The second network node 18 further comprises a memory 1108. The memory comprises one or more units to be used to store data on, such as network slice information, wireless device IDs, network slice and roaming policies, Slice IDs applications to perform the methods disclosed herein when being executed, and similar.

The methods according to the embodiments described herein for the second network node 18 are respectively implemented by means of e.g. a computer program 1109 or a computer program product, comprising instructions, i.e., software code portions, which, when executed on at least one processor, cause the at least one processor to carry out the actions described herein, as performed by the second network node 18. The computer program 1109 may be stored on a computer-readable storage medium 1110, e.g. a disc or similar. The computer-readable storage medium 1110, having stored thereon the computer program, may comprise the instructions which, when executed on at least one processor, cause the at least one processor to carry out the actions described herein, as performed by the second network node 18. In some embodiments, the computer-readable storage medium may be a non-transitory computer-readable storage medium.

Figure 12:
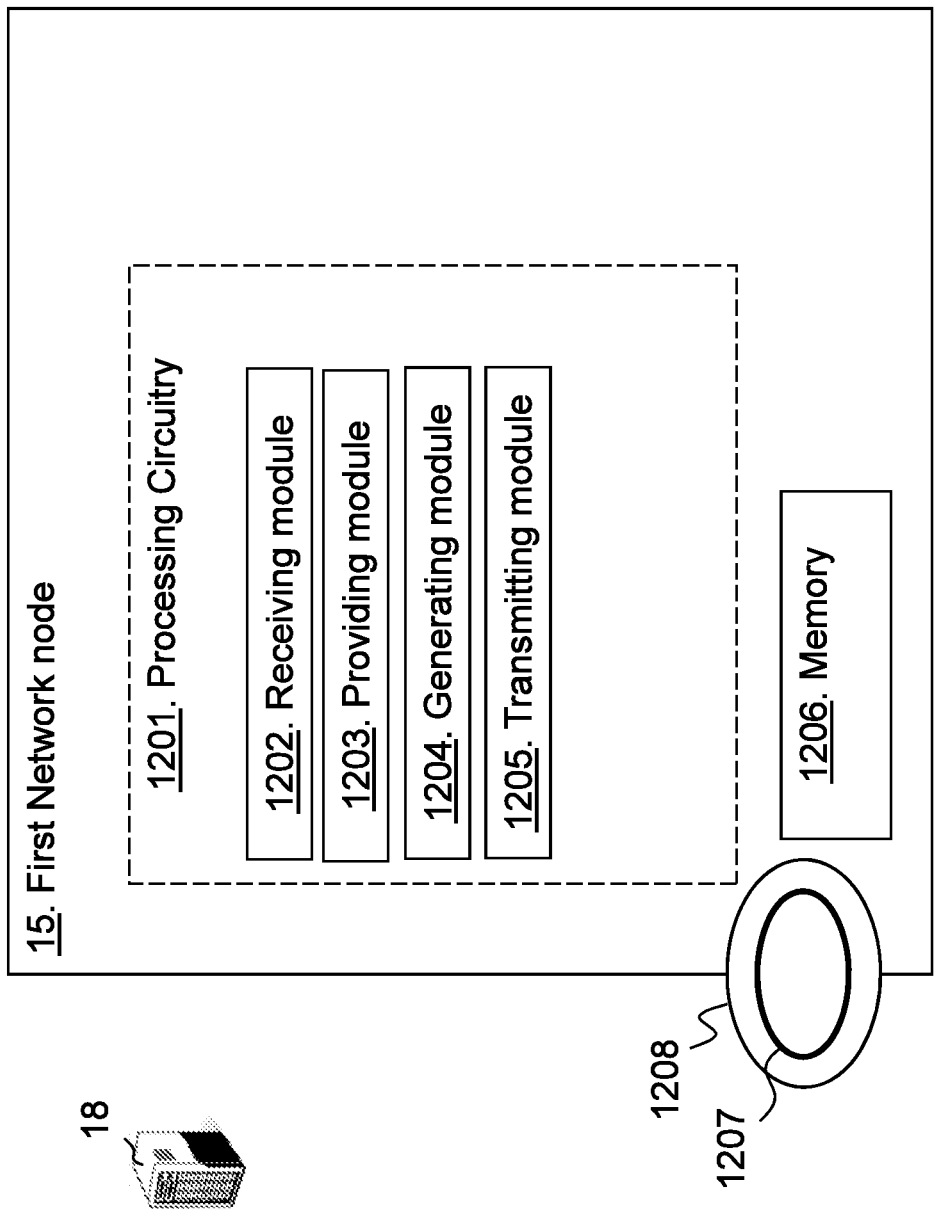
FIG. 12 is a block diagram depicting a first network node according to embodiments herein.

FIG. 12 is a block diagram depicting the first network node 15 for enabling communication for the wireless device 10 in the communication network 1. The communication network 1 comprises the first network and the second network, which first network is the home network of the wireless device 10. As stated above the first network comprises partitioned sets of functionalities wherein the first set of functionalities belongs to the first network slice supporting the wireless device 10, and which first set of functionalities is separated from another set of functionalities out of the total set of functionalities in the first network. The first network node 15 may comprise a processing unit 1201, e.g. one or more processors, configured to perform the methods described herein.

The first network node 15 is configured to, when the wireless device 10 is roaming from the first network to the second network, receive the request for a connection establishment to the second network node 18 associated with the second network. The first network node 15 may comprise a receiving module 1202. The processing unit 1201 and/or the receiving module 1202 may be configured to receive, when the wireless device 10 is roaming from the first network to the second network, the request for a connection establishment to the second network node 18 associated with the second network.

The first network node 15 is further configured to provide the policy indication to the second network node 18, which policy indication indicates the first network slice and roaming policy for the wireless device 10 in the first network. The first network node 15 may comprise a providing module 1203. The processing unit 1201 and/or the providing module 1203 may be configured to provide the policy indication to the second network node 18, which policy indication indicates the first network slice and roaming policy for the wireless device 10 in the first network.

The first network node 15 may further be configured to receive, from the second network node 18, the policy request requesting retrieval of the policy indication. The policy request may further comprise data relating to the second network. Thus, the processing unit 1201 and/or the receiving module 1202 may be configured to receive, from the second network node 18, the policy request requesting retrieval of the policy indication.

The first network node 15 may further be configured to generate the policy indication based on the received data and information of the first network for the wireless device 10. The first network node 15 may comprise a generating module 1204. The processing unit 1201 and/or the generating module 1204 may be configured to generate the policy indication based on the received data and information of the first network for the wireless device 10. The first network node 15 may furthermore be configured to transmit the policy indication to the second network node 18. The first network node 15 may comprise a transmitting module 1205. The processing unit 1201 and/or the transmitting module 1205 may be configured to transmit the policy indication to the second network node 18. The information of the first network for the wireless device 10 may comprise the first network slice and roaming policy for the wireless device 10 in the first network. The first network node 15 may also be configured to retrieve the first network slice and roaming policy from an operations support system node or a business support system node. The processing unit 1201 and/or the transmitting module 1205 may be configured to retrieve the first network slice and roaming policy from the operations support system node or the business support system node.

The first network node 15 further comprises a memory 1206. The memory comprises one or more units to be used to store data on, such as network slice information, wireless device IDs, network slice and roaming policies, Slice IDs applications to perform the methods disclosed herein when being executed, and similar.

The methods according to the embodiments described herein for the first network node 15 are respectively implemented by means of e.g. a computer program 1207 or a computer program product, comprising instructions, i.e., software code portions, which, when executed on at least one processor, cause the at least one processor to carry out the actions described herein, as performed by the first network node 15. The computer program 1207 may be stored on a computer-readable storage medium 1208, e.g. a disc or similar. The computer-readable storage medium 1208, having stored thereon the computer program, may comprise the instructions which, when executed on at least one processor, cause the at least one processor to carry out the actions described herein, as performed by the first network node 15. In some embodiments, the computer-readable storage medium may be a non-transitory computer-readable storage medium.

Embodiments herein relate to a network with network slices i.e. a (core or RAN or both) network with partitioned sets of functionalities where the first network slice node 13 supports the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a second network node for enabling communication for a wireless device in a communication network, wherein the communication network comprises a first network and a second network, wherein the second network node is associated with the second network and the first network is a home network of the wireless device, wherein the first network comprises partitioned sets of functionalities, and wherein a first network slice supports the wireless device, the method comprising:
when the wireless device is roaming from the first network to the second network, initiating a connection establishment to a first network node associated with the first network;
retrieving a policy indication from the first network node, wherein the policy indication indicates the first network slice and a roaming policy for the wireless device in the first network, wherein a first set of functionalities belongs to the first network slice supporting the wireless device, and wherein the first set of functionalities is separated from another set of functionalities out of a total set of functionalities in the first network; and
triggering a selection of a second network slice and a roaming policy for the wireless device in the second network based on the retrieved policy indication and internal data related to the second network, wherein the internal data comprises at least a slice capability of the second network, and wherein triggering the selection comprises:
comparing and analyzing the retrieved first network slice and the roaming policy for the wireless device in the first network and one or more local network slices and roaming policies; and
determining that the second network slice and the roaming policy for the wireless device in the second network are a preferred network slice and a preferred roaming policy for the wireless device in the second network.

2. The method according to claim 1, further comprising receiving a connection request from the wireless device comprising a slice indication, wherein the slice indication indicates the first network slice, and wherein the triggered selection is further based on the slice indication.

3. The method according to claim 1, wherein the retrieving comprises:
transmitting, to the first network node, a policy request requesting retrieval of the policy indication, wherein the policy request comprises data related to the second network and/or wireless device information of the wireless device; and receiving the policy indication from the first network node.

4. The method according to claim 1, further comprising:
performing the selection of the second network slice and the roaming policy for the wireless device in the second network; and
initiating a transmission of a response to the wireless device, wherein the response is taking the selected second network slice and the selected roaming policy into account.

5. The method according to claim 1, wherein the triggering further comprises suggesting a suggested network slice and a suggested roaming policy for the wireless device in the second network based on the retrieved policy indication and the internal data related to the second network, and wherein the suggested network slice and the suggested roaming policy is transmitted to a radio access network node associated with the second network.

6. The method according to claim 1, wherein the retrieved policy indication further comprises a slice capability for the wireless device in the first network.

7. A non-transitory computer-readable storage medium, having stored thereon a computer program comprising instructions which, when executed on at least one processor, cause the at least one processor to carry out the method according to claim 1, as performed by the second network node.

8. A method performed by a first network node for enabling communication for a wireless device in a communication network, wherein the communication network comprises a first network and a second network, wherein the first network is a home network of the wireless device, wherein the first network comprises partitioned sets of functionalities, and wherein a first network slice supports the wireless device, the method comprising:
when the wireless device is roaming from the first network to the second network, receiving a request for a connection establishment to a second network node associated with the second network;
receiving, from the second network node, a policy request requesting retrieval of a policy indication, wherein the policy request comprises data related to the second network, and wherein the data comprises at least a slice capability of the second network;
generating the policy indication based on the data related to the second network and information of the first network for the wireless device; and
providing the policy indication to the second network node, wherein the policy indication indicates the first network slice and a roaming policy for the wireless device in the first network, wherein a first set of functionalities belongs to the first network slice supporting the wireless device, and wherein the first set of functionalities is separated from another set of functionalities out of a total set of functionalities in the first network, wherein the first network slice and the roaming policy for the wireless device in the first network and one or more local network slices and roaming policies are compared and analyzed, and wherein a second network slice and a roaming policy for the wireless device in the second network are determined as a preferred network slice and a preferred roaming policy for the wireless device in the second network.

9. The method according to claim 8, wherein the providing comprises transmitting the policy indication to the second network node.

10. The method according to claim 8, wherein the information of the first network for the wireless device comprises the first network slice and the roaming policy for the wireless device in the first network, and wherein the first network slice and the roaming policy is retrieved from an operations support system node or a business support system node.

11. A non-transitory computer-readable storage medium, having stored thereon a computer program comprising instructions which, when executed on at least one processor, cause the at least one processor to carry out the method according to claim 8, as performed by the first network node.

12. A second network node for enabling communication for a wireless device in a communication network, wherein the communication network comprises a first network and a second network, wherein the second network node is associated with the second network and the first network is a home network of the wireless device, wherein the first network comprises partitioned sets of functionalities, wherein a first network slice supports the wireless device, and wherein the second network node is configured to:
when the wireless device is roaming from the first network to the second network, initiate a connection establishment to a first network node associated with the first network;
retrieve a policy indication from the first network node, wherein the policy indication indicates the first network slice and a roaming policy for the wireless device in the first network, wherein a first set of functionalities belongs to the first network slice supporting the wireless device, and wherein the first set of functionalities is separated from another set of functionalities out of a total set of functionalities in the first network; and
trigger a selection of a second network slice and a roaming policy for the wireless device in the second network based on the retrieved policy indication and internal data related to the second network, wherein the internal data comprises at least a slice capability of the second network, and wherein the second network node is configured to trigger the selection by being configured to:
compare and analyze the retrieved first network slice and the roaming policy for the wireless device in the first network and one or more local network slices and roaming policies; and
determine that the second network slice and the roaming policy for the wireless device in the second network are a preferred network slice and a preferred roaming policy for the wireless device in the second network.

13. The second network node according to claim 12, further being configured to receive a connection request from the wireless device comprising a slice indication, wherein the slice indication indicates the first network slice, and wherein the triggered selection is further based on the slice indication.

14. The second network node according to claim 12, being configured to retrieve the policy indication by being configured to:
transmit, to the first network node, a policy request to retrieve the policy indication, wherein the policy request comprises data related to the second network and/or wireless device information of the wireless device; and receive the policy indication from the first network node.

15. The second network node according to claim 12, further being configured to:
  perform the selection of the second network slice and the roaming policy for the wireless device in the second network; and
  initiate a transmission of a response to the wireless device, wherein the response takes the selected second network slice and the selected roaming policy into account.

16. The second network node according to claim 12, being configured to trigger the selection of the second network slice and the roaming policy by being further configured to:
  suggest a suggested network slice and a suggested roaming policy for the wireless device in the second network based on the retrieved policy indication and the internal data related to the second network; and
  transmit the suggested network slice and the suggested roaming policy to a radio access network node associated with the second network.

17. The second network node according to claim 12, wherein the retrieved policy indication further comprises a slice capability for the wireless device in the first network.

18. A first network node for enabling communication for a wireless device in a communication network, wherein the communication network comprises a first network and a second network, wherein the first network is a home network of the wireless device, wherein the first network comprises partitioned sets of functionalities, wherein a first network slice supports the wireless device, and wherein the first network node is configured to:
  when the wireless device is roaming from the first network to the second network, receive a request for a connection establishment to a second network node associated with the second network;
  receive, from the second network node, a policy request to retrieve a policy indication, wherein the policy request comprises data related to the second network, and wherein the data comprises at least a slice capability of the second network;
  generate the policy indication based on the data related to the second network and information of the first network for the wireless device; and
  provide the policy indication to the second network node, wherein the policy indication indicates the first network slice and a roaming policy for the wireless device in the first network, wherein a first set of functionalities belongs to the first network slice supporting the wireless device, and wherein the first set of functionalities is separated from another set of functionalities out of a total set of functionalities in the first network, wherein the first network slice and the roaming policy for the wireless device in the first network and one or more local network slices and roaming policies are compared and analyzed, and wherein a second network slice and a roaming policy for the wireless device in the second network are determined as a preferred network slice and a preferred roaming policy for the wireless device in the second network.

19. The first network node according to claim 18, further being configured to transmit the policy indication to the second network node.

20. The first network node according to claim 18, wherein the information of the first network for the wireless device comprises the first network slice and the roaming policy for the wireless device in the first network, and wherein the first network node is configured to retrieve the first network slice and the roaming policy from an operations support system node or a business support system node.

\* \* \* \* \*